June 18, 1968 A. H. McELROY 3,388,449
APPARATUS FOR FORMING INTEGRALLY FINNED TUBING
Filed Sept. 16, 1965 11 Sheets-Sheet 1

Fig. 1.

INVENTOR
ARTHUR H. McELROY
BY
ATTORNEYS

Fig. 2.

INVENTOR.
ARTHUR H. McELROY

Fig. 3.

INVENTOR.
ARTHUR H. McELROY

BY Head & Johnson

ATTORNEYS

INVENTOR
ARTHUR H. McELROY

BY

ATTORNEYS

Fig. 10.

INVENTOR
ARTHUR H. McELROY

BY

ATTORNEYS

United States Patent Office 3,388,449
Patented June 18, 1968

3,388,449
APPARATUS FOR FORMING INTEGRALLY
FINNED TUBING
Arthur H. McElroy, 2789 E. 45th Place,
Tulsa, Okla. 74105
Filed Sept. 16, 1965, Ser. No. 487,857
3 Claims. (Cl. 29—202)

ABSTRACT OF THE DISCLOSURE

An L-shaped fin stock is helically wound about tubing such that the foot portion is directed towards the bare tubing or upstream side and caused to sealably overlap the adjacent downstream applied fin foot.

---

This invention relates to apparatus and methods for forming finned heat transfer tubing. More particularly, this invention relates to an improved finned tube having improved means for securing the fin to the tube surface for increased heat transferring surface contact.

There are many apparatus and methods of producing finned tubing available. Invariably, however, the resultant finned stock includes areas where the finned stock is not in good heat transfer relation with the tubing or with the next adjacent fin.

This invention has for its object to provide an improved finned tubing stock which is of increased heat transfer ability over that presently available, and which provides improved interengagement of the fin with the tubing and the next adjacent fin so as to form a substantially unitary heat transfer surface.

Fin tubing of the type described herein generally comprises a metallic bare tube upon the external surface of which is secured a continuous thin ribbon-like metallic fin in the form of a helix. Fin tubing of this nature is extensively used in the manufacture of heat exchangers.

It is an object of this invention to provide an apparatus and method for forming finned heat transfer tubing wherein said fin stock extends helically around said tubing, and wherein that portion of the fin adjacent the bare tubing is formed to be coaxial with the axis of the tubing and hence provide more efficient heat transferring surface for heat exchangers and the like.

Still a further object of this invention is to provide an apparatus and method for winding fin stock upon axially advancing and rotating tubing stock while simultaneously preforming the fin strip and causing it to be secured to the exterior surface of the tubing in a helical path of predetermined pitch.

Still further objects of this invention are to provide novel means for supplying and advancing the tubing stock; means for supplying and advancing the fin stock relative thereto; and a novel forming means.

These and other objects of this invention will become more apparent upon further reading of the specification and claims when taken in conjunction with the following illustrations of which:

Detailed description

Figure 1:
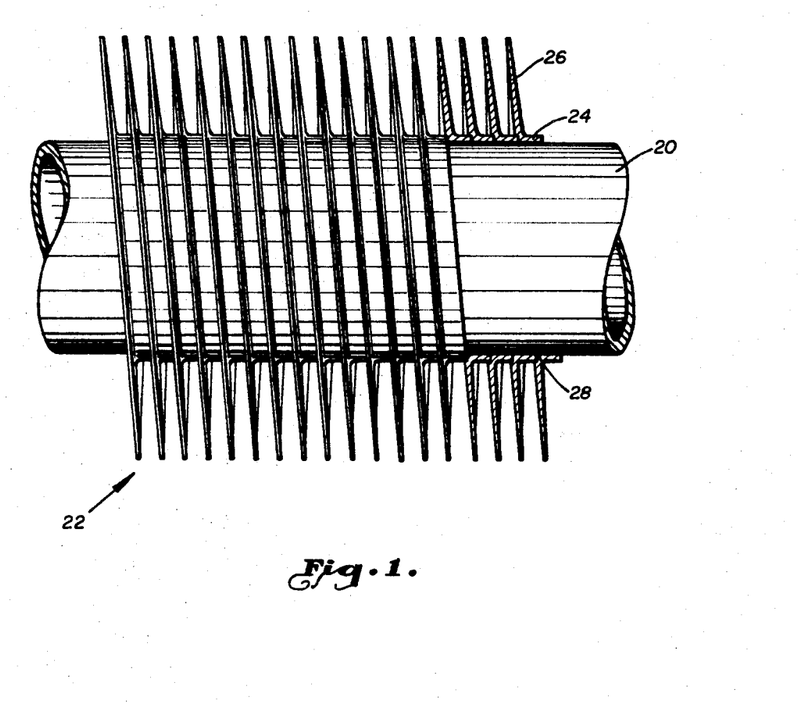
FIGURE 1 is a partial sectional view of finned tubing stock manufactured in accordance with the apparatus of this invention.

FIGURE 1 represents a short section of finned tubing produced as a result of the apparatus of this invention and represents an article of manufacture having greater finned retention ability to the tubing and higher and more efficient heat transfer characteristics. Tubing 20 includes helically wound fins generally designated by the numeral 22. Specifically, the fin is formed from a relatively thin rectangular band of ductile metal, such as special alloy aluminum. The original metal band is deformed to the approximate cross-sectional shape as shown in FIGURE 1 including an L-shaped leg portion 24 which is wrapped under tension about tubing 20 by the apparatus of this invention hereinafter described. The vertical portion of fin stock 22 is shaped to form an upwardly and inwardly tapered leg 26. In addition, the process is so adapted that the fin which is being formed is so positioned as to deformably interengage with the previously formed fin as described in FIGURE 1 at 28.

Figure 2:
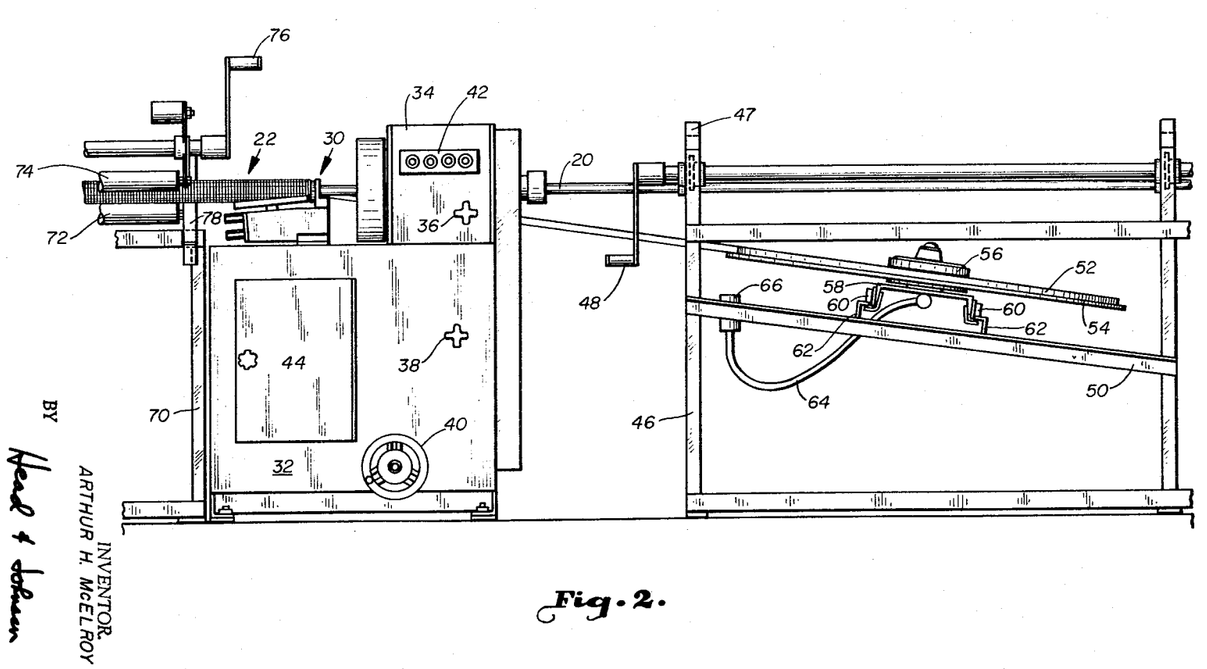
FIGURE 2 is a front elevational view of the primary operational portions of the apparatus of this invention.
Figure 3:
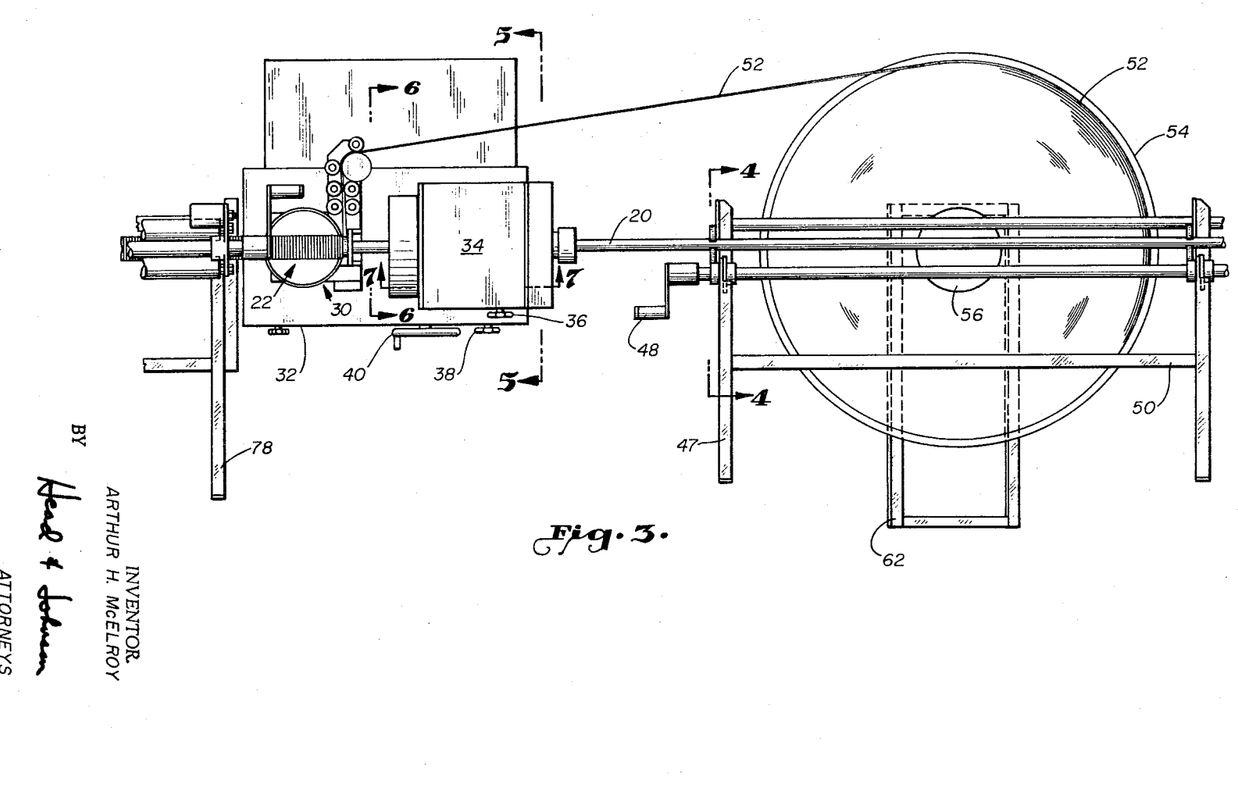
FIGURE 3 is a top elevational view of the fin forming apparatus of this invention.

In FIGURES 2 and 3 the fin forming apparatus of this invention is partially shown in front and top elevation. It is to be understood that the input tubing support system to the right may extend for whatever lengths of bare tubing are desired and similarly the resulting finned stock will extend to the left for the desired lengths. The fin forming mechanism of this invention is generally designated in this view by the numeral 30 which is supported upon a cabinet structure 32 which is adapted to cover, support and retain the various drive mechanisms including the drive-head mechanism 34 which is adapted to control the axial or longitudinal speed of tubing 20 as it progresses from right to left in this view. An adjustable control 36 is provided for changing this axial speed by changing the pitch of the drive rollers. A control knob 38 provides exterior means for adjusting the speed of the fin forming mechanism 30 while hand wheel 40 is adapted to provide adjustment to the rotational speed of tubing 20. Switch bank 42 provides intermittent, forward, reverse, and stop control over the apparatus of this invention. The cabinet 32 includes an opening 44 to the interior thereof as needed for adjustment or repair.

On the input tubing side, suitable frame 46 is adapted to support tubing release mechanism lever 48, the details of which are described hereinafter. Support frame 50 is canted as shown to a support for coiled fin stock 52. The coil is supported upon circular table 54 which is a part of hub 56 all of which are rotatably supported upon frame 58. Frame 58 includes a plurality of guide rollers 60 on each side thereof which are supported upon rails 62 to permit frame 58 to be laterally moved outward from support frame 46 and frame 50 to add additional fin coil stock as needed. A brake mechanism, not shown, in the interior of drum 56 is operated hydraulically or pneumatically by way of line 64 from a suitable inertia control 66, the control fluid source not shown.

Frame 70 is adapted to support the necessary guide rollers 72 and 74 for finned tubing 22. Crank arm means 76 is adapted to rotate supporting roller 74 and permit release of desired lengths of finned tubing stock. Guide rack 78 is canted downwardly and outwardly toward the viewer in FIGURE 2 and is adapted to support a plurality of finned tubing.

Figure 4:
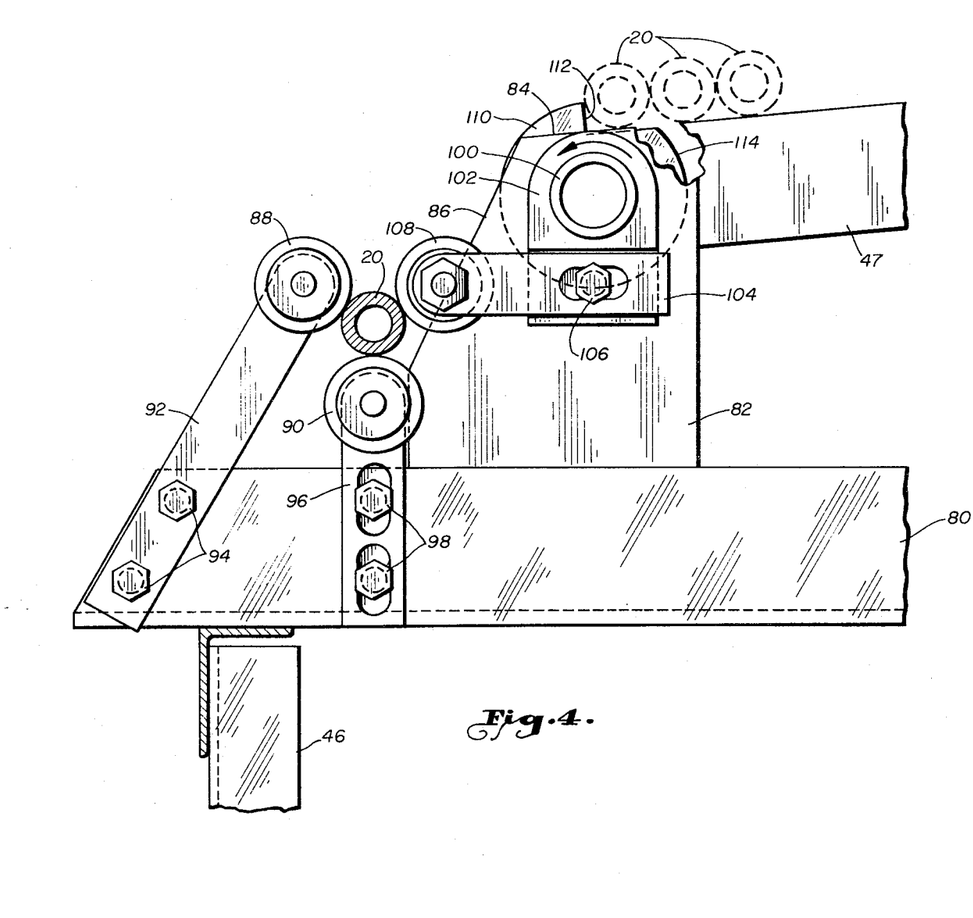
FIGURE 4 is a sectional view of the bare tube rack taken along the lines 4—4 of FIGURE 3.

Referring now to FIGURE 4, the numeral 46 represents the vertical frame supporting member while the numeral 47 represents tubing support rack for bare tubing stock 20. This rack is canted downwardly and inwardly toward the axis of the bare tubing 20 which is undergoing finning. The tubing stock 20 is available for usage at any desired length and as such a plurality of horizontally spaced release and support members as shown in FIGURE 4 may be provided to rotatively support and release tubing 20 as the case may be. The support and release mechanism includes a horizontal support 80 which is supported upon vertical members 46. Vertical member 82 extends upwardly from support 80 to retain tubing rack 47 which is canted as previously described whereby the tubing will tend to roll to the left thereof as shown in FIGURE 4. Member 82 terminates its upper end 84 in the same plane as tubing supply support 47 to permit the tubing stock 20 to roll thereacross. The forward end 86 acts as a guide when tubing stock is released to roll thereon into position with respect to rollers 88 and 90. Roller guide 88 is rotatively supported upon member 92 which is affixed to support 80 by bolts 94. Similarly, the lower roller 90 is rotatably supported upon member 96 which in turn is vertically adjustable to member 90 and retained in the desired position by bolts 98. Tubing release lever 48, not shown in FIGURE 4, is affixed to tubular shaft 100 and rotatable therewith. The shaft 100 extends the desired horizontal length of the tubing release mechanism. On the near side of vertical extension 82 and attached to tubing 100 is a crank member 102 to which is adjustably attached support member 104 which is retained in the desired fixed position with respect to crank 102 by nut and bolt assembly 106. At the forward end of support 104 is roller 108. The entire assembly, shaft 100, crank 102 and roller and support 108 and 104 are adapted to rotate about the axis of tubular member 100 as shown by the arrow when so operated by release lever 48. On the other side of support plate 82 is a tubing release member 110 which likewise is affixed to tubular shaft 100 and rotatable therewith. This arcuate member includes a stop-portion 112 which is adapted to retain tubing stock 20 upon the rack 47 until release lever 48 is rotated in a counterclockwise direction. Guide stop surface 114 permits movement of only one length of tubing stock 20 at a time as hereinafter more fully described.

Figure 5:
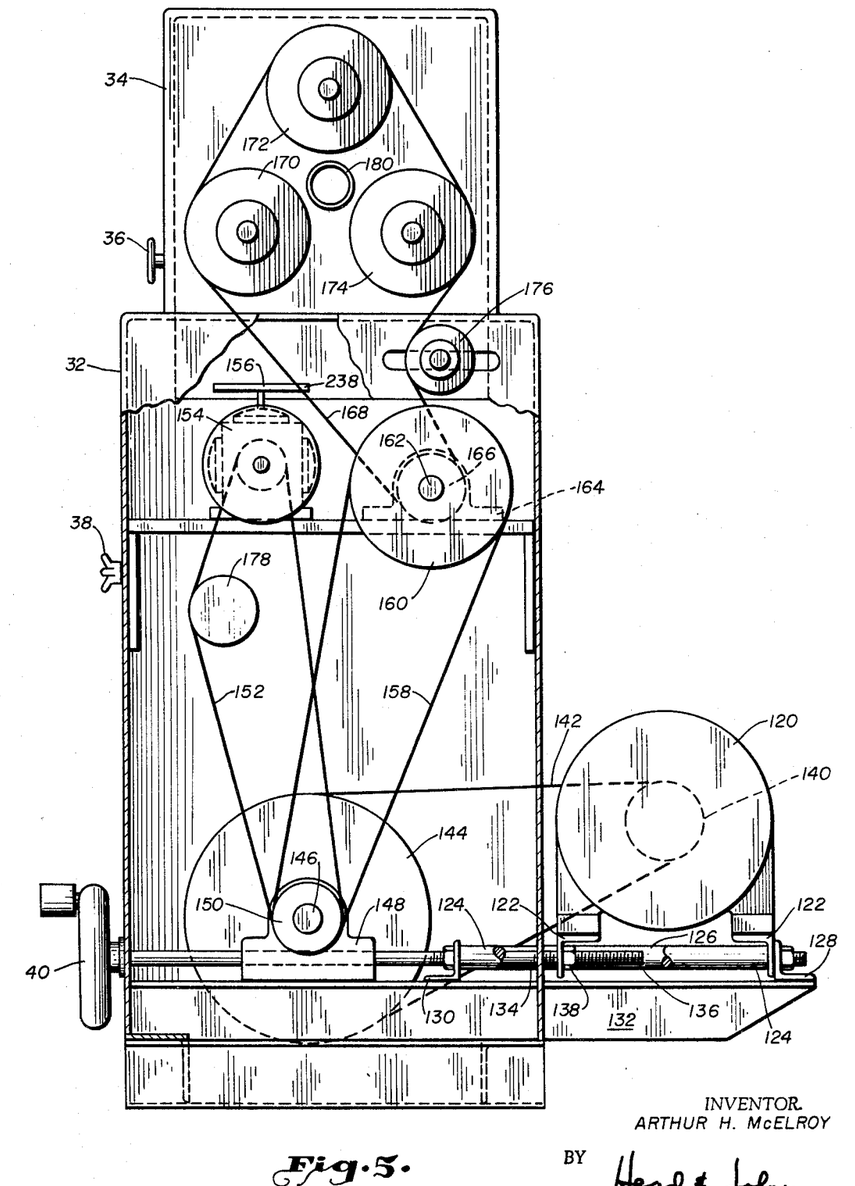
FIGURE 5 is a sectional view taken along the line 5—5 of FIGURE 3.

Referring now to FIGURE 5, primary power supply 120 is supported upon frame members 122. Frame members 122 are, in turn, supported for horizontal movement on parallel guide rods 124 and 126. These guide rods are affixed to support frames 128 and 130 which forms a part of the base frame 132. Variations in r.p.m. of the primary power supply 120 occurs by rotation of wheel 40 through the coaction of shaft 134 which includes a threaded portion 136 rotatable with respect to fixed nut 138 which is rigidly affixed to frame members 122. The output of primary power supply 120 includes well known means for varying the output speed such as a variable diameter sheave which changes with respect to the various horizontal positions of the motor frame 122 on guide rod supports 124 and 126. That is, in the position substantially as shown the motor output power supply is in its relatively low speed position. As the motor and frame is moved to the left the output speed is thus increased. The output power is supplied by belt 142 to sheave 144 which is rotatably supported to horizontal shaft 146. Rotating shaft 146 rests and is supported upon a plurality of pillow block bearings 148. At the other end of the shaft 146 is affixed a dual sheave 150, one portion of the sheave drives belt 152 to a variable drive 154, the output of which at sheave 156 drives the finning head mechanism, hereinafter described. The other portion of sheave 150 drives the tubing both rotatably and axially through belt 158, which in turn drives sheave 160. Sheave 160 is supported on its axis 162 to the frame by pillow block bearings 164. Adjacent to sheave 160 on shaft 162 is a sheave 166 shown in dotted lines which includes an endless belt 168 which rotates the tubing drive sheaves 170, 172 and 174. And idler pulley 176 is adjustable with respect to frame 32 for tensioning belt 168. Similarly idler pulley 168 adjusts the tension of belt 152 to the finning head drive mechanism.

Figure 6:
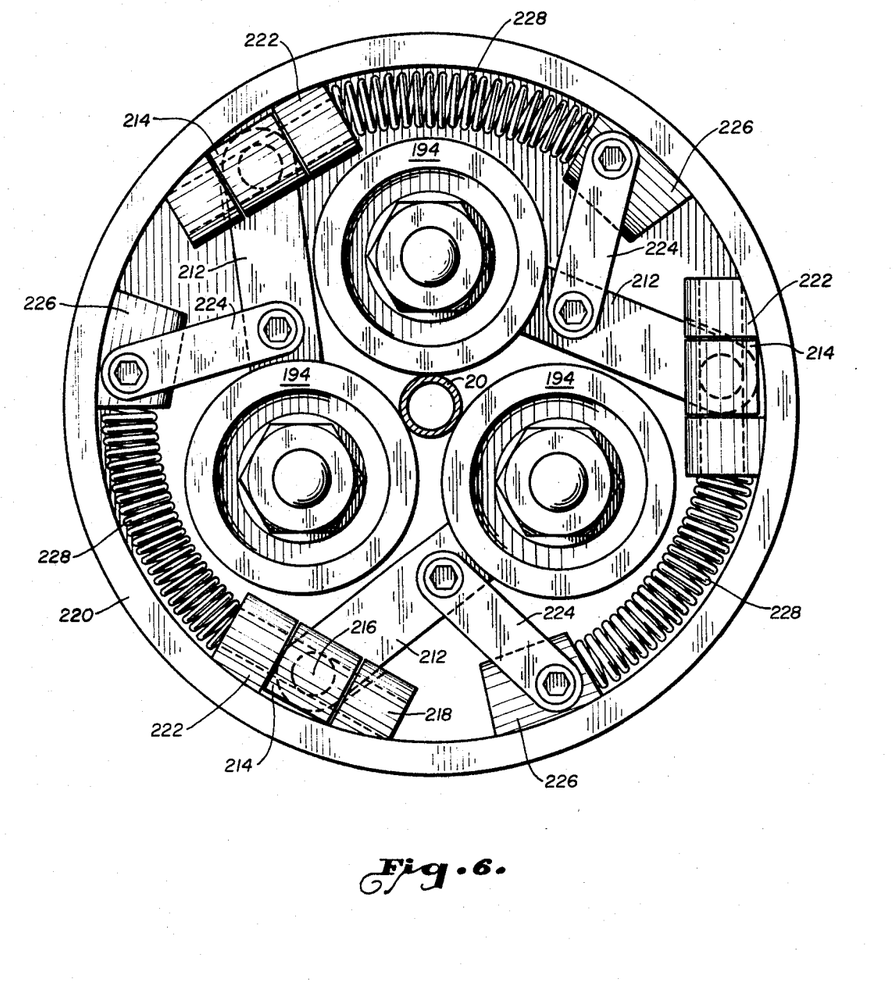
FIGURE 6 is a sectional view of the drive chuck of this invention taken along 6—6 of FIGURE 3.
Figure 7:
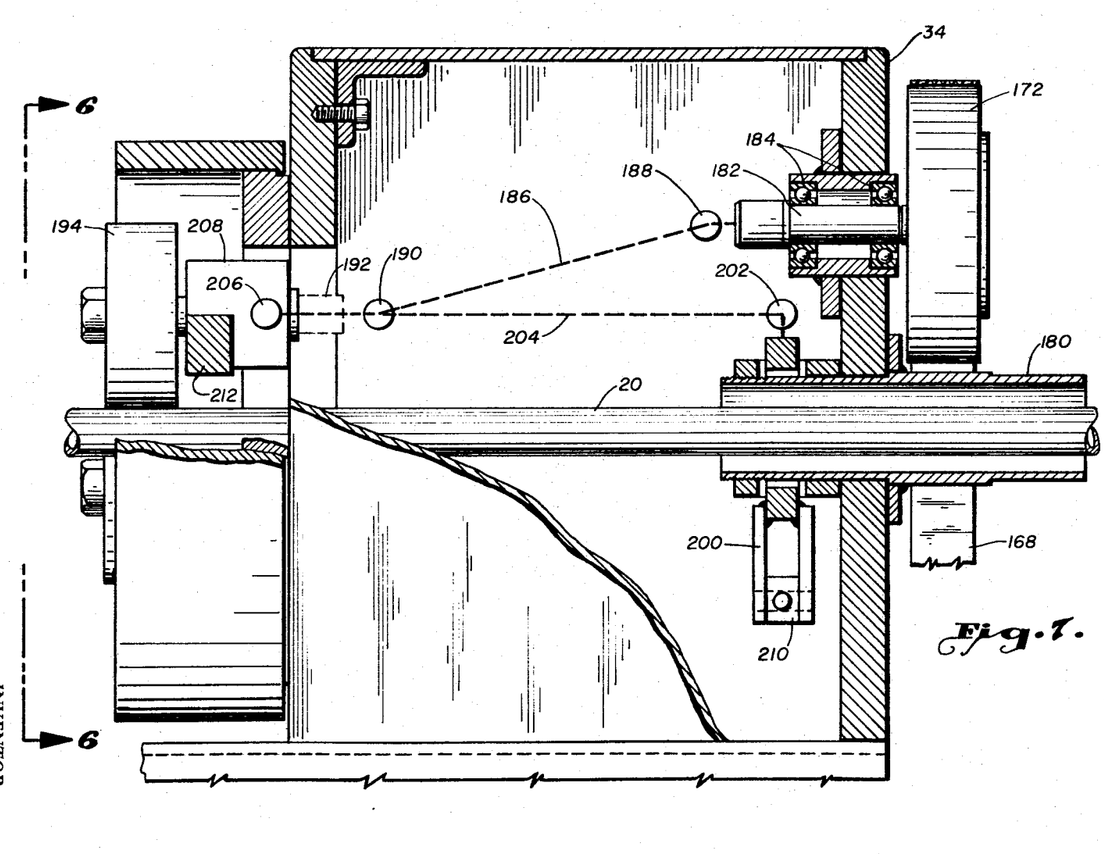
FIGURE 7 is a partial sectional view of the drive head of this invention taken along the line 7—7 of FIGURE 3.

Referring now to FIGURE 6, a frontal elevation view of the drive roll assembly is shown with tubing stock 20 in position with respect to friction drive rolls 194. In this view, since there are three identical rolls, like parts will be given like numerals. Each connecting arm 212 is connected at one end to a drive roll bearing housing 208 (shown in FIGURE 7) and at the other end to a spindle 214 which is adapted for dual pivotal movement about axis shaft 216 in a directional plane perpendicular to the axis of the tubing stock 20, and about axis shaft 218. Pivotal movement about shaft 216 is for diameter changes of tubing 20 causing pivotation of arm 212, connector rod 224 and movable rod anchor 226 against spring 228. Pivotal movement about axis shaft 218 permits pitch adjustment of each roller, which is a simultaneous motion as best described in FIGURE 7. In FIGURE 7 the drive head details in this invention are depicted and although only one of the three drive head mechanisms is shown, this is for illustrative purposes only as the other drive head mechanisms are equally spaced about the axis of tubing 20, identical. Drive sheave 172, driven by belt 168, includes a shaft 182 which is rotatably supported by bearings 184 to the housing 34. A connecting shaft schematically depicted by dotted line 186 connects at one end to shaft 182 by a universal joint 188. The other end of the shaft is connected by universal joint 190 which in turn is attached to shaft 192 for rotating drive roll 194. A pitch adjusting mechanism 200 is rotatably supported about tube bearing case 180 and includes three equally spaced ball and socket connections 202 (only one shown here) including shaft 204 directly attached to ball and socket connection 206 of the drive roll bearing housing 208. In operation, hand wheel 36 rotates a threaded shaft in nut 210 which rotates pitch adjusting mechanism 200 drawing the drive rolls angularly with respect to the tubing and hence cause same to not only rotate but to be driven axially in the direction of the arrow.

Figure 8:
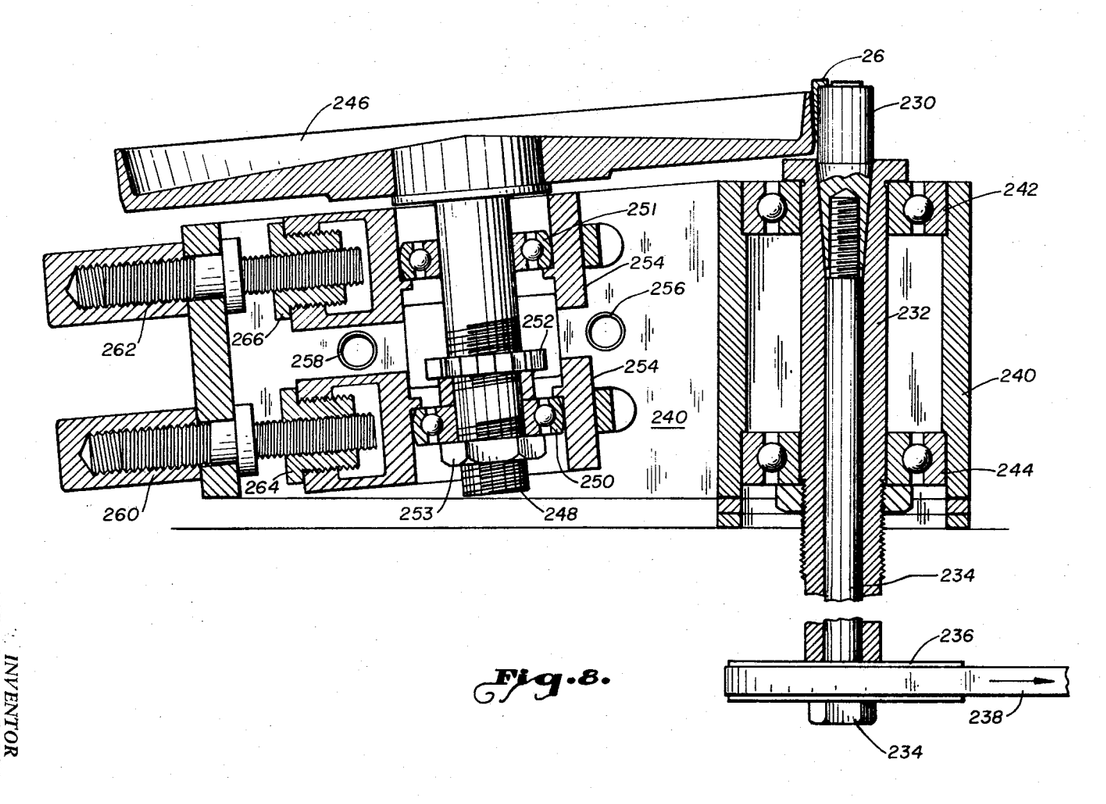
FIGURE 8 is a frontal sectional view of the finning head drive assembly.

In FIGURE 8, the fin forming mechanism is described in cross-section. Finning spindle 230 is retained in a spindle housing 232 by bolt 234 threaded thereinto. A sheave 236 is keyed to housing 232. Belt 238 from variable drive 154 and sheave 156 as shown in FIGURE 5 is adapted to rotate the spindle and spindle housing together, with respect to support 240, through bearings 242 and 244. Forming wheel 246 is contiguous to the finning spindle 230 in such a manner as to finally form the fin, as shown in cross-section of FIGURE 1, by pressure and deformation of the fin stock material. The forming wheel includes an axle 248 which is adjustably supported by spherical seat self aligning bearings 250 and 251 to a support housing 254. Elevating nut 252 and lock nut 253 are utilized to retain the desired position of forming wheel 246. Threaded openings 256 and 258 are adapted to receive bolts which permit clamp locking of bearing blocks in position. Rolling angle and rolling force is accomplished by movement of threaded shafts 260 and 262 with respect to nuts 264 and 266.

Figure 9:
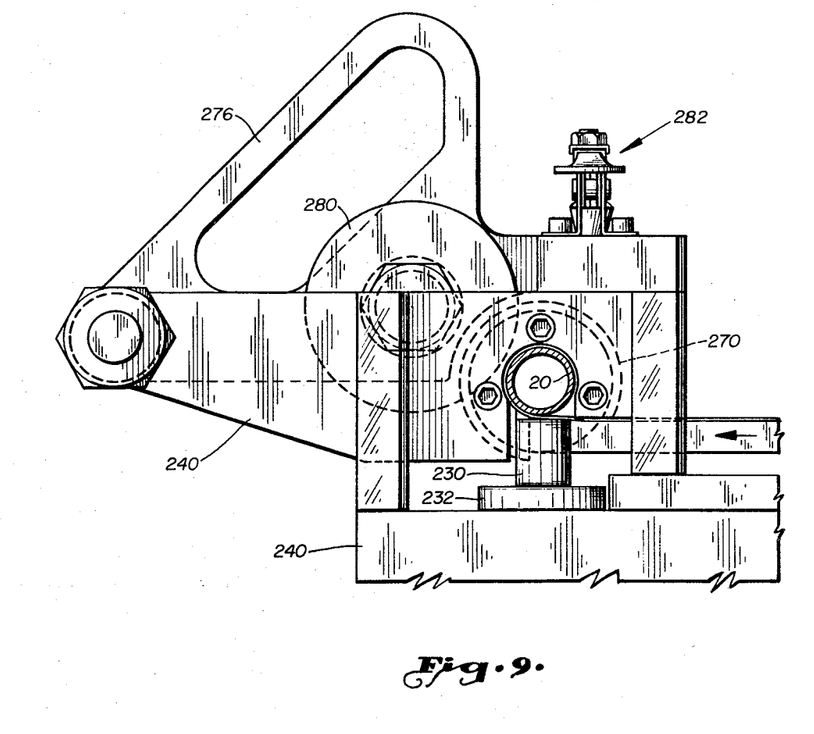
FIGURE 9 is a frontal view from the bare tube side of the finning head apparatus.
Figure 10:
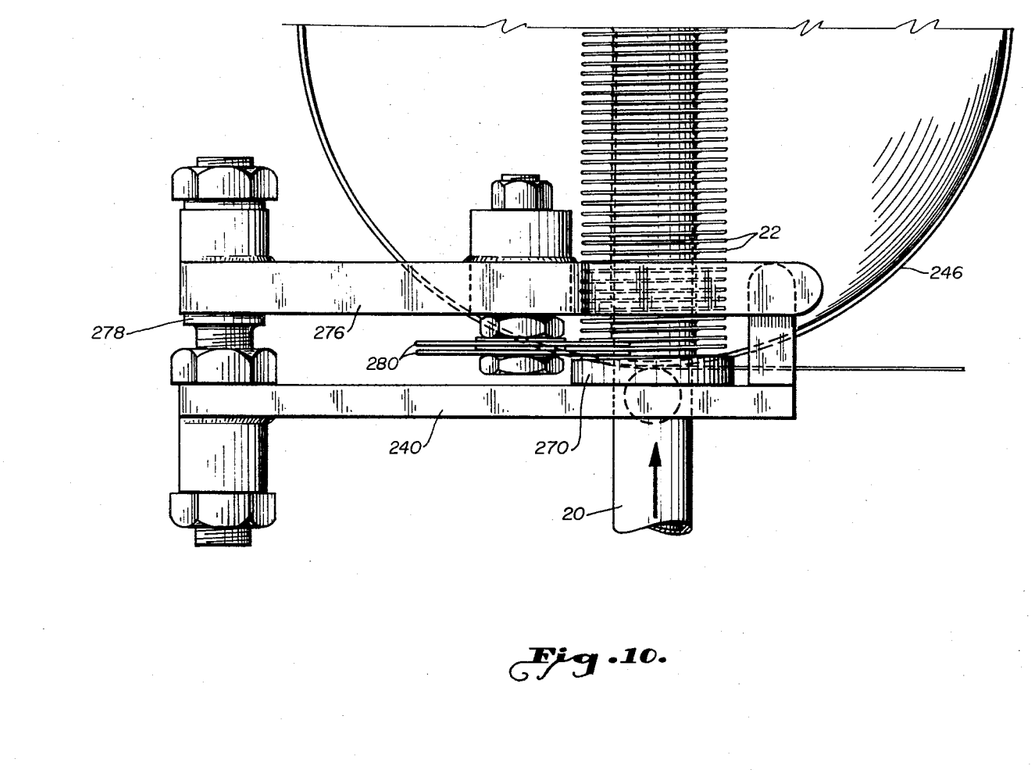
FIGURE 10 is a top elevational view of the fin forming and finning head devices.

As shown in the views of FIGURES 9 and 10, looking downstream, finned tubing 22 is moving in a direction shown by the arrow from the preforming roller which thereafter guides and directs the fin stock into the fin helix 270. The fin helix is adapted to be replaceably supported upon support frame 240. Its angular face will depend upon the tubing size, fin stock rotative and axial speed. In any event, the helix member 270 is adapted to assist in preforming the fin stock about the tubing at the desired helix and pitch. A rolling fin guide member 276 is retained upon support 240 pivotally about shaft 278 in a plane transverse to the axis of the finned tubing 22.

The guide includes spaced wheels 280 which are adapted to rotate by friction against fin surface 22 as it rotates when in the position as shown. This provides straightening, alignment, combing and spacing support to the newly formed fins emerging from fin helix member 270. An off-center clamp 282 maintains the rolling fin guide member fixed, yet provides quick release as desired.

Figure 11:
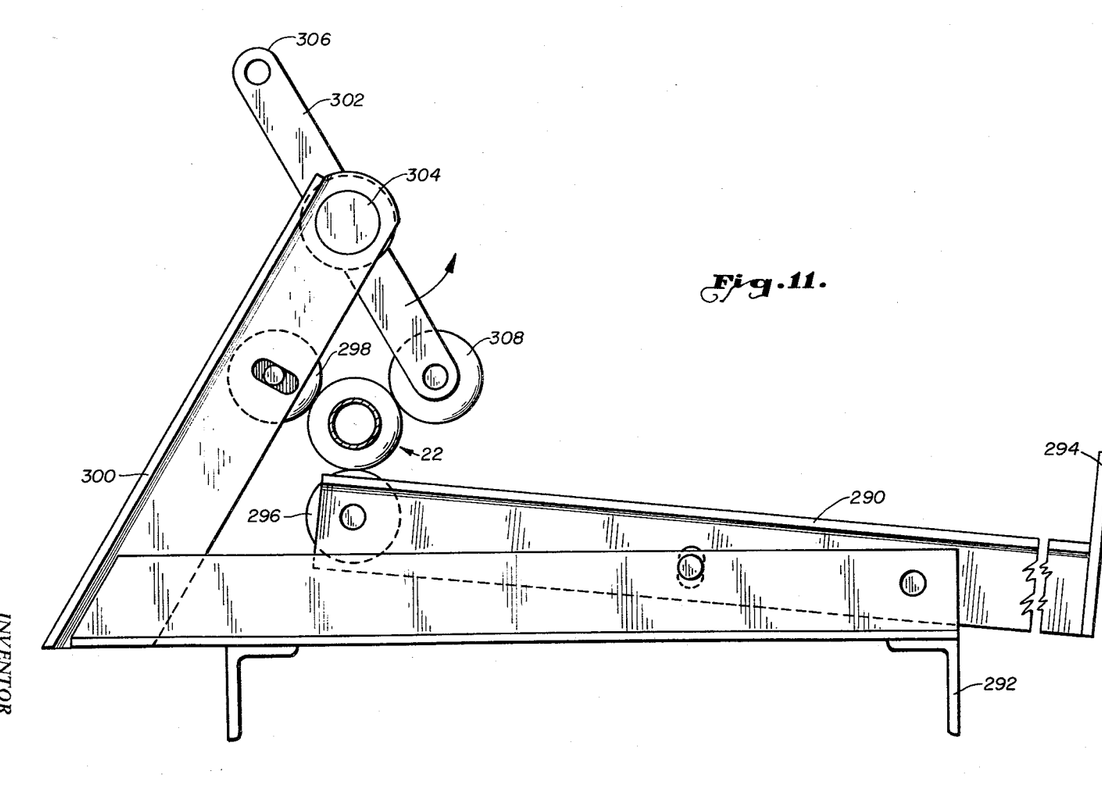
FIGURE 11 is a side view of the finned tube rack taken along the line 11—11 of FIGURE 3.

FIGURE 11 is illustrative of the finned tube storage rack which is represented as 290 which is adjustably supported upon frame 292 and includes a stock member 294. The fin stock is supported by three equally spaced longitudinal rollers 296, 298 and 308. These rollers, of course, can be adjusted to properly orient the finned tube 22. An angular bracket 300 is adapted to pivotally support crank arm 302 about shaft 304. A counter weight is positioned at the end designated at 306 while at the other end a longitudinal roller 308 is positioned to normally support the rotating and axially moving finned tubing stock 22. When a given length of tubing stock is desired and cut, the arm 302 is rotated in the direction shown by the arrow thus releasing finned tube 22 to roll down inclined support member 290 where it is retained.

This invention and its operation can be readily understood with reference to the hereinbefore description of the apparatus and its subcombinations. The apparatus is adapted to provide heat transfer finned tubing wherein the L-shaped fin stock is securely wrapped in a helical manner about the tubing such that the horizontal foot of the fin is in full surface engagement with the tubing and wherein the adjacent newly formed fin deformably engages the outer free end of the horizontal foot of the preceding fin such that a substantially unitary heat transfer surface is formed as a cold welding like process. Although variations in the rotative and axial speeds with respect to the fin forming speed are involved, it has been found that the application of pressure upon the horizontal foot by the continuous rolling effect of the new fin being formed which is made possible by forming the fin with toe upstream achieves the result as depicted in FIGURE 1.

Although this invention has been described with reference to specific embodiments, it is to be understood that this application is not limited thereto as other equivalents will become readily apparent to persons skilled in the art and yet be fully within the scope and coverage of the claims appended hereto.

What is claimed is:
1. Apparatus for forming finned tubing comprising:
   means to unidirectionally rotate and axially move bare tubing stock towards a fin forming system;
   said fin forming system comprising:
   (a) means to supply deformable fin stock;
   (b) means to form fin stock into an L-shape cross-section having a horizontal foot and a vertical leg;
   (c) means to direct and feed said fin shape substantially transversely toward said tubing such that the free end of said foot is directed toward the upstream axial movement of said tubing stock and such that the bottom of said horizontal foot is tangential to the outer periphery of said tubing;
   (d) means to spirally wrap said fin shape about said tubing while deforming said vertical leg to an outwardly-inwardly taper; and
   (e) means to maintain the pitch of said fin less than the horizontal length of said foot whereby said foot will engagingly abut over the next adjacent downstream foot.

2. Apparatus according to claim 1 including means to supply and support said bare tubing for rotational and axial movement comprising:
   longitudinally spaced sets of support rollers, each set including three rollers which, in one position, are equally angularly spaced in a plane transverse with respect to the axis of said tubing, two of said rollers substantially fixed and the third roller adapted for pivotal movement with and about the axis of a crank member;
   a supply tubing release and a guide stop member also pivoted with and about the said axis of said crank member;
   a bare tubing supply rack; and
   means to rotate said crank member in one direction whereby said third roll and said release member permit a single length of said tubing to drop into position with respect to said two fixed rollers, and in the reverse direction to re-position said third roller in said one position.

3. Apparatus according to claim 1 wherein said means to unidirectionally rotate and axially move said bare tubing comprises:
   a drive chuck;
   three equally angularly spaced rollers in a plane transverse to the axis of said tubing and in frictional contact therewith;
   a connecting arm supporting bearings for each of said rollers from said drive chuck, said arm pivotal at each chuck about a first axis which is parallel to the axis of said tubing and about a second axis which is perpendicular to said first axis;
   a rod connecting from said connecting arm to a rod anchor, said anchor movable against a spring bias with respect to said drive chuck;
   means to separately drive each of said rollers at the speed; and
   means to simultaneously change the pitch of said rollers with respect to the axis of said tubing.

References Cited
UNITED STATES PATENTS

| | | | |
|---|---|---|---|
| 1,570,117 | 1/1926 | Zimmerman | 29—202 |
| 2,604,138 | 7/1952 | Harrison | 29—202 |
| 2,162,694 | 6/1939 | Berg et al. | 29—157.3 |
| 3,077,928 | 2/1963 | Nihlen et al. | 165—184 X |
| 3,095,639 | 7/1963 | Seien | 29—202 |

THOMAS H. EAGER, *Primary Examiner.*

ROBERT A. O'LEARY, *Examiner.*

T. W. STREULE, *Assistant Examiner.*